United States Patent

Gonsior

[11] Patent Number: 5,971,015
[45] Date of Patent: Oct. 26, 1999

[54] CHECK VALVE

[75] Inventor: Wolfgang Gonsior, Bodolz, Germany

[73] Assignee: Xomox International GmbH & Co., Lindau/Bodensee, Germany

[21] Appl. No.: 09/079,392

[22] Filed: May 15, 1998

[30] Foreign Application Priority Data

May 15, 1997 [DE] Germany .................. 297 08 655 U

[51] Int. Cl.⁶ .................................................. F16K 15/00
[52] U.S. Cl. ................ 137/533.11; 137/539; 137/533.19
[58] Field of Search ..................... 137/533.11, 533.13, 137/533.15, 325, 539, 533.19

[56] References Cited

U.S. PATENT DOCUMENTS

| | | | |
|---|---|---|---|
| 2,103,427 | 12/1937 | Long .................................. | 137/533.11 |
| 4,244,961 | 1/1981 | Schnabel ............................ | 137/533.11 |
| 4,286,622 | 9/1981 | Ninomiya et al. .................. | 137/539 |
| 4,687,023 | 8/1987 | Harbison et al. . | |

FOREIGN PATENT DOCUMENTS

| | | |
|---|---|---|
| 1057840 | 5/1959 | Germany . |
| 55-139566 | 10/1980 | Japan . |
| 57-001871 | 7/1982 | Japan . |

*Primary Examiner*—Denise L. Ferensic
*Assistant Examiner*—Joanne Y. Kim
*Attorney, Agent, or Firm*—Evenson, McKeown, Edwards & Lenahan, P.L.L.C.

[57] ABSTRACT

A check valve having a housing (2, 4) and a ball (22) movably disposed therein on a guide member (28) and driven by a flowing medium, and able to come in contact with a seat (24) due to the force of gravity. The check valve is designed such that, even in case of low pressure differences or small back-flows of the flowing medium, a secure blocking is assured. To this end the guide means is configured as a ridge (28) of plastic which slopes toward the seat, on whose upper edge (30) the ball (22) can roll onto or into the seat (24), and the ridge (28) is disposed entirely within the first housing member (2).

18 Claims, 1 Drawing Sheet

CHECK VALVE

BACKGROUND OF THE INVENTION

The invention relates to a check valve with a housing and a ball disposed movably therein on a guide means, which can be entrained by a flowing medium and as a result of gravity can come in contact with a seat.

A check valve of this type is disclosed in Harbison et al., U.S. Pat. No. 4,687,023 and has in a first housing member guiding means for a ball which can move in the flow passage. The two lateral guiding means are arranged substantially parallel to one another, extend into a second housing member, and are in contact with the substantially parallel inside lateral surfaces of the second housing member. The guiding means have guiding surfaces configured as curves for the ball, which are inclined inwardly and, when the check valve is installed in the horizontal position, downwardly. Above the flow passage the check valve contains a deflection chamber into which the ball is moved by the flowing medium and which necessitates a housing of comparatively large outside dimensions. The guiding means consist of the same material, namely metal, as the first housing member and it must be made comparatively large and stiff in order to avoid damage or even breakage during manufacture and assembly. This check valve cannot easily be provided with an internal lining of plastic, since lining the guiding means extending substantially freely into the second housing member would require a considerable enlargement of the outside dimensions of the check valve.

Furthermore, German Examined Application No. DE-AS 1,057,840 discloses a check valve which has two arcuate wires as tracks for guiding the ball. The ball is driven along these arcuate wires by the flowing medium into a bypass chamber. The bypass chamber requires the check valve to have relatively large outside dimensions. The check valve cannot easily be provided with a lining of plastic since the fixation and covering of the arcuate wires with a coating would entail considerable difficulty.

SUMMARY OF THE INVENTION

Setting out from this state of the art, it is the object of the invention to provide a check valve of the kind described above which assures high reliability of operation combined with a simple design.

It is also an object of the invention to provide a check valve which assures a reliable shutoff of the fluid even when the pressure differences are slight.

A further object of the invention is to provide a check valve which has an internal lining of plastic and yet can be manufactured and assembled at low cost.

These and other objects of the invention are achieved by providing a check valve including a housing comprising first and second housing parts, and a ball disposed movably on a guide member in the housing such that the ball can be moved by gravity into contact with a valve seat or can be entrained by a flowing medium flowing through the valve and lifted off the valve seat, wherein the guide member is configured as a ridge formed of synthetic resin material which slopes toward the valve seat and has an upper edge on which the ball can roll onto the valve seat, the ridge being disposed entirely within the first housing part.

The check valve of the present invention is characterized by functional design and contains at least one projection or ridge which is inclined toward the seat and on which the ball rolls by gravity onto and into the seat. The ridge is formed of synthetic resin or plastic and is preferably a component of a plastic lining. It is particularly preferred to make the ridge and lining of synthetic resins such as FEP, PFA or PVDF. The ball check valve of the invention can thus be employed without special requirements as to the course of the pipe, and it assures a reliable checking action even in the case of very slight pressure differences. The check valve of the invention can be used in any desired position, that is, in horizontal pipelines as well as in vertical or inclined pipelines.

The check valve advantageously comprises two housing members, the first housing member containing at least the ridge and the second housing member containing the valve seat. The ridge and likewise the valve seat are formed of a synthetic resin and are especially an integral part of a plastic lining of the two housing members, which are formed of metal. The ridge is disposed entirely within the first housing member and the free axial end face of the ridge is within the first housing member and preferably is in contact with a confronting face of the synthetic resin or plastic lining of the second housing member. The ridge rises in a substantially radial direction and lies preferably in an axial plane which passes through the longitudinal axis of the housing. The formation of the lining with the valve seat on the one hand and with the ridge on the other hand can be carried out with comparatively little difficulty. The check valve can be used in any position and can be used equally in horizontal, vertical or inclined pipelines. Since the guiding means is a plastic ridge and the seat is made of plastic the easy mobility of the ball is assured, and even when pressure differences are slight a tight contact between the ball and the seat is assured.

Further details and preferred embodiments of the invention are described below.

BRIEF DESCRIPTION OF THE DRAWINGS

The invention will be described in further detail hereinafter with reference to illustrative preferred embodiments depicted in the accompanying drawings, without limiting its scope. In the drawings.

DETAILED DESCRIPTION OF PREFERRED EMBODIMENTS

Figure 1:
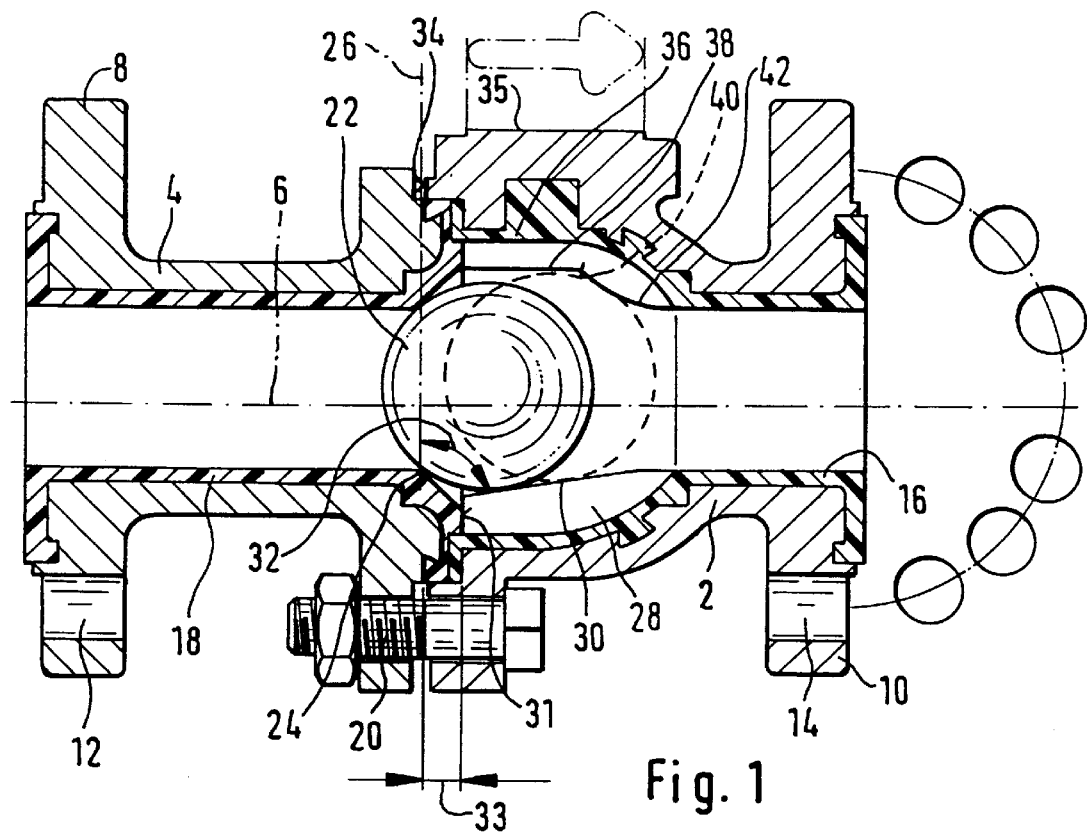
FIG. 1 shows the check valve according to the invention with metal housing members and a plastic lining.

The check valve comprises a housing with two housing members 2, 4, which preferably are formed of metal. The valve is depicted in a horizontally installed position with the longitudinal axis 6 horizontal. For connection and for establishing a connection to a pipeline, the housing members 2 and 4 have at their respective free ends flanges 8 and 10, each having a number of bores 12 and 14 distributed in a known manner about the circumference.

The check valve with its two metal housing members 2 and 4 is provided with a lining 16, 18, of synthetic resin, i.e. plastic. The two housing members 2 and 4 are joined together by bolts 20, an appropriate number of such bolts being distributed around the circumference with respect to the longitudinal axis 6.

Within the housing is disposed the ball 22, which preferably is formed of a synthetic resin material such as polytetrafluorothylene (PTFE). As shown, the ball 22 is in contact with the seat 24 which is a component of the lining 18. The plane indicated by the broken line 26, in which the ball 22 is in contact with the plastic seat 24, is orthogonal to the longitudinal axis 6 which in the installed position shown here is aligned substantially horizontally.

The lining 16 of the first housing member 2 contains as the ball guide a lower ridge 28 whose upper edge 30 slopes downwardly toward the seat 24. The ridge 28, which is formed of plastic, has an axial end face 31 which is within the first housing member 2. The upper edge 30 is at an obtuse angle 32 with respect to the seat plane 26. Thus, even at small pressure differences or small amounts of reverse flow, the ball will securely roll by gravity to the position shown in the drawing. The obtuse angle 32 is, according to the invention, in the range between 5 and 25 degrees of angle, preferably between 10 to 20 degrees of angle, an angle on the order of 15° having proved to be advantageous. The axial end face 31 of the ridge 28 lies at a given distance 33 from the end face 34 of the first housing member 2, this end face 34 facing the second housing member 4. The ridge 28 has but a small width in the circumferential direction, preferably on the order of a few millimeters, so that the flow cross section is only slightly reduced.

A portion of the housing, preferably the first housing member 2 with the plastic ridge 38, is provided with a mark 35 indicating the direction of flow. When the check valve is installed horizontally in a pipeline, care must be taken to see that the mark is on top, and thus the lower ridge 28, when in the installed state as shown, is actually at the lowest point so that the ball 24 can roll into the seat 24. The lining 16 of the first housing member 2 furthermore contains additional ridges 36 whose free edges 38 are directed radially inward and run substantially parallel to the longitudinal axis 6. As indicated by the broken line 40, the ball is driven to the right in the drawing by the medium flowing through the check valve in the direction of the arrow mark 35 and rests on curved edges or contact surfaces 42 of the additional ridges 36, while the medium can flow through the open spaces between the individual ridges which have but little width. The arrangement of the invention with at least one plastic ridge 28, in combination with the illustrated upper additional ridge 36 diametrically opposite it, avoids the need for a special deflection chamber for the ball 22. Instead, according to the invention, the medium flowing in the through-direction flows around the ball. There is no deflection chamber or any other dead space in which residues, foreign bodies or solid particles in the medium can deposit themselves. Since no special deflection chamber is provided for the ball, the external dimensions of the check valve are reduced to a minimum.

Figure 2:
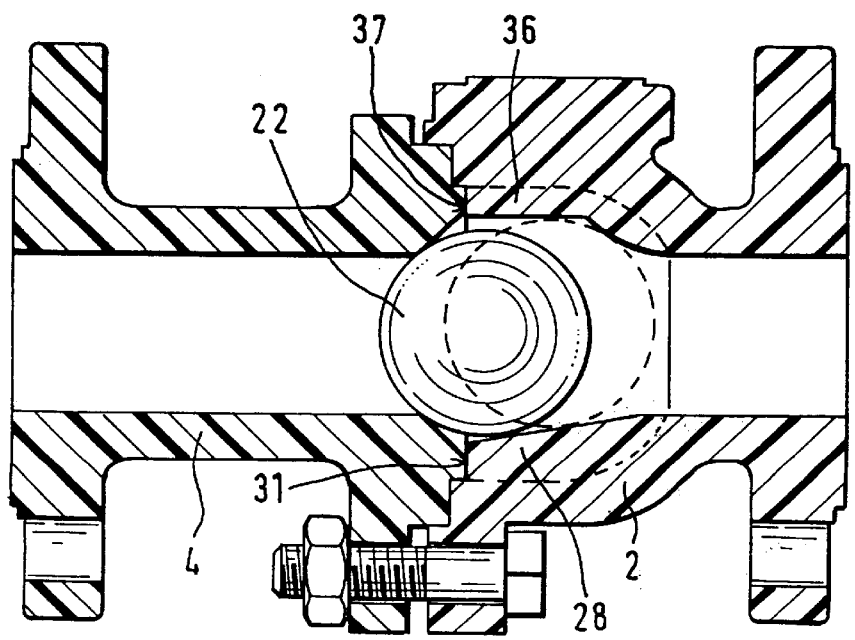
FIG. 2 depicts a check valve embodiment according to the invention having a plastic housing.

FIG. 2 shows an alternative embodiment of the check valve according to the invention in which the housing is made entirely of plastic. The ridges 28 and 36 are integral with the plastic housing member 2, and the seat 24 is likewise an integral part of the plastic housing piece 4. Since the axial end faces 31 and 37 are within the first housing member, the ridges can likewise be made comparatively narrow, so that they produce only a slight narrowing of the flow cross section, and consequently the external dimensions of the check valve can be kept small.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A check valve, comprising:
   a housing comprising first and second housing parts,
   a guide member of synthetic resin material, and
   a ball disposed moveably on said guide member such that the ball can be moved by gravity into contact with a valve seat or can be entrained by a flowing medium flowing through the valve and lifted off the valve seat, wherein said guide member comprises:
      a guide member ridge having an upper edge that slopes downward toward the valve seat on which the ball can roll onto the valve seat, said guide member ridge being disposed entirely within the first housing part, and
      a second ridge having a free edge that is radially directed inward and runs substantially parallel to a longitudinal axis.

2. A check valve according to claim 1, wherein said upper edge of said ridge is substantially straight or planar and lies at an obtuse angle relative to a plane defined by the valve seat, said plane defined by the valve seat lying substantially orthogonal to the longitudinal axis of the valve.

3. A check valve according to claim 2, wherein said obtuse angle is between 5° and 25°.

4. A check valve according to claim 2, wherein said obtuse angle is between 10° and 20°.

5. A check valve according to claim 2, wherein said obtuse angle is about 15°.

6. A check valve according to claim 1, wherein said ridge is integrated into a plastic lining in the interior of the check valve.

7. A check valve according to claim 1, wherein said valve seat is an integral part of a plastic lining in the interior of the check valve.

8. A check valve according to claim 1, wherein the valve seat is disposed within the second housing part.

9. A check valve according to claim 1, wherein the guide member ridge and the second ridge are disposed on opposite sides of the valve housing and lie in a common axial plane.

10. A check valve according to claim 1, wherein the guide member ridge has an axial end face which is disposed within the first housing part and is offset from the axial end face of said first housing part.

11. A check valve according to claim 1, wherein is provided with a mark indicating the orientation in which the valve should be installed for the ball to roll by gravity onto the valve seat.

12. A check valve according to claim 11, wherein said mark is provided on the first housing part within which the guide member ridge is disposed.

13. A check valve according to claim 11, wherein said mark is disposed exteriorly on said first housing part diametrically opposite the guide member ridge.

14. The check valve of claim 1, wherein said first and second housing parts each have an internal lining of a synthetic resin material.

15. The check valve of claim 14, wherein an axial end face of the guide member ridge lies at one axial end face of the internal lining of the second housing part.

16. The check valve of claim 14, wherein edges of the first and second housing parts lie directly against one another and at a distance away from an axial end face of said guide member ridge.

17. The check valve of claim 1, wherein the second ridge further has a curved edge or contact face.

18. The check valve of claim 17, wherein the second ridge is arranged such that when the ball is entrained by the flowing medium and lifted off the valve seat, the ball comes into contact with the free edge of the second ridge and rests on said curved edge or contact surface of the second ridge.

* * * * *